Patented Feb. 20, 1934

1,947,819

UNITED STATES PATENT OFFICE 1,947,819

ALKOXY-2-HYDROXYNAPHTHALENE-3-CARBOXYLIC ACIDS

Arthur Zitscher, Offenbach-on-the-Main, Hans Mildner, Leverkusen-I. G. Werk, and Wilhelm Luce, Hofheim-on-the-Taunus, Germany, assignors to General Aniline Works, Inc., New York, N. Y., a corporation of Delaware No Drawing. Application July 17, 1931, Serial No. 551,554, and in Germany August 1, 1930

5 Claims. (Cl. 260—111)

Our present invention relates to alkoxy-2-hydroxynaphthalene-3-carboxylic acids; more particularly it relates to compounds of the general formula

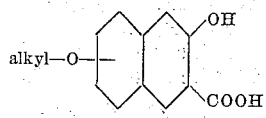

We have found that alkoxy-2-hydroxynaphthalene-3-carboxylic acids containing the alkoxy group in the non-carboxylated nucleus are obtainable by subjecting a derivative of 2-hydroxynaphthalene-3-carboxylic acid containing a hydroxy group as a substituent in the non-carboxylated nucleus to the action of an alkylating agent under mild conditions.

Inasmuch as it is known that dihydroxynaphthalene compounds in which each of the two nuclei is substituted by one hydroxy group, for instance, 2.6-dihydroxy-naphthalene, are mostly converted into dialkoxy-naphthalene compounds by the action of an alcohol in the presence of an acid, it was surprising that in the reaction between the aforesaid hydroxy-derivative of 2-hydroxy-naphthalene-3-carboxylic acid and an alkylating agent under mild conditions, only the hydroxy group in the non-carboxylated nucleus is alkylated.

According to the conditions of the reaction, the carboxylic acid group may also be esterified. The alkoxy-2-hydroxy-3-carboxylic acid esters, thus obtained, can easily be converted into the corresponding free carboxylic acids by subjecting them to a suitable saponification process.

As alkylating agents there may be used, for instance, an alcohol, for instance, methyl or ethyl alcohol, in the presence of an acid, or the sodium salt of methyl sulfuric acid, or dimethyl sulfate, or homologues of these compounds, for instance, alkali metal salts of ethyl sulfuric acid or diethyl sulfate, or similar agents.

Our new products have the properties of ortho-hydroxy-carboxylic acids, they give, for instance, in an aqueous solution a blue color with ferric chloride.

The following examples serve to illustrate the invention, but they are not intended to limit it thereto. The parts are by weight, unless otherwise stated:

(1) 1 part of 2.6-dihydroxynaphthalene-3-carboxylic acid is boiled for 24 hours with 5 parts of a solution of 10% strength, of sulfuric acid in methyl alcohol. From the cooled solution a substance crystallizes; it is filtered with suction and washed with a small quantity of cold methyl alcohol. The filtrate contains unaltered parent material, which is more easily soluble in alcohol than the mono-methylated product, and may be used for preparing a further quantity of the latter. The mass remaining on the filter dissolves partly in a solution of sodium carbonate, partly in dilute caustic soda solution. The solution in caustic soda is boiled for a short time in order to saponify the carboxylic acid ester which has been formed, and is then combined with the solution in sodium carbonate. The solution thus obtained is acidified with sulfuric acid and the 6-methoxy-2-hydroxynaphthalene-3-carboxylic acid of the formula

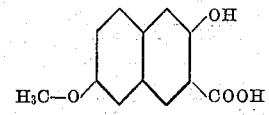

is obtained by filtering with suction. The acid is easily purified by recrystallization from alcohol. It crystallizes in the form of yellow needles, melting at 233° C.

(2) 74 parts of 2.6-dihydroxynaphthalene-3-carboxylic acid, 70 parts of sodium methyl sulfate, 55 parts of caustic soda solution of 40° Bé. and 230 parts of water are heated to boiling. After boiling the solution for a short time, there precipitates the sodium salt of the 6-methoxy-2-hydroxynaphthalene-3-carboxylic acid, which is more sparingly soluble in water than is the sodium salt of the parent material. After cooling, the whole is filtered with suction and the sodium salt of the aforesaid acid remaining on the filter is washed with a small quantity of a solution of sodium chloride. It may be purified by recrystallization from water. The free acid is identical with that described in Example 1.

(3) 1 part of 2.6-dihydroxynaphthalene-3-carboxylic acid is boiled for 24 hours with 10 parts of a solution of 10% strength, of sulfuric acid in ethyl alcohol. The solution is rendered alkaline by addition of sodium carbonate, while stirring, and the alcohol is distilled. When heated with water, the residue dissolves with the exception of a small quantity of carboxylic acid ester. The sodium salt of 6-ethoxy-2-hydroxynaphthalene-3-carboxylic acid thus formed may be precipitated from its aqueous solution by addition of a solution of sodium chloride. The free acid crystallizes from xylene in the form of beautiful, pure yellow needles, melting at 219° C. It has the following structure:

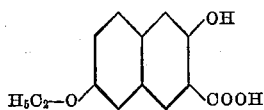

(4) 20 parts of 2.8-dihydroxynaphthalene-3-carboxylic acid are dissolved in 200 parts of methyl alcohol and 60 parts of fuming sulfuric acid of 20% strength are added thereto. The mixture is heated to boiling for 24 hours. The 8-methoxy-2-hydroxynaphthalene-3-carboxylic acid methyl ester thus formed precipitates. It is filtered with suction and saponified by boiling with a sodium carbonate solution. By acidifying the solution thus obtained, the 8-methoxy-2-hydroxynaphthalene-3-carboxylic acid precipitates; it melts at 248° C. after recrystallization from alcohol. The new compound has the following formula

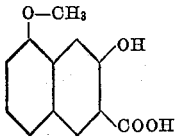

(5) 204 parts of 2.6-dihydroxynaphthalene-3-carboxylic acid are dissolved in 500 parts by volume of a 2n sodium carbonate solution. At about +5° C., 126 parts of dimethylsulfate are added to the solution. In the course of 2 hours, 115 parts of caustic soda solution of 40° Bé. are stirred into the solution at about 5° C. to 10° C., whereby the sodium salt of the 6-methoxy-2.3-hydroxynaphthoic acid, thus formed, precipitates. By addition of sodium chloride, the precipitation of the salt is completed. The salt obtained is filtered with suction and worked up as described in Example 2. By treating the salt with an acid, the free 6-methoxy-2-hydroxy-naphthalene-3-carboxylic acid is obtained. Its properties are described in Example 1.

We claim:

1. As new products, the alkoxy-2-hydroxynaphthalene-3-carboxylic acids of the general formula:

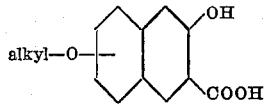

wherein the alkoxy group stands in the non-carboxylated nucleus, said compounds being easily soluble in alkalies and giving in an aqueous solution a blue color with ferric chloride.

2. As new products, the alkoxy-2-hydroxy-3-carboxylic acids of the general formula:

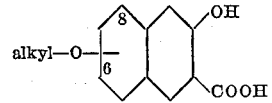

wherein the alkoxy group stands in one of the positions 6 and 8, said compounds being easily soluble in alkalies and giving in an aqueous solution a blue color with ferric chloride.

3. As a new product, 6-methoxy-2-hydroxy-naphthalene-3-carboxylic acid of the formula:

crystallizing from alcohol in the form of yellow needles, melting at 233° C., being easily soluble in alkalies and giving in an aqueous solution a blue color with ferric chloride.

4. As a new product, 6-ethoxy-2-hydroxynaphthalene-3-carboxylic acid of the formula:

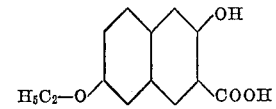

crystallizing from xylene in the form of yellow needles, melting at 219° C., being easily soluble in alkalies and giving in an aqueous solution a blue color with ferric chloride.

5. As a new product, 8-methoxy-2-hydroxy-naphthalene-3-carboxylic acid of the formula

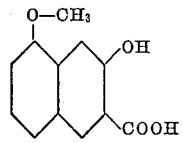

crystallizing from alcohol in the form of yellow crystals, melting at 248° C., being easily soluble in alkalies and giving in an aqueous solution a blue color with ferric chloride.

ARTHUR ZITSCHER.
HANS MILDNER.
WILHELM LUCE.